(12) United States Patent  
Ukraintsev et al.

(10) Patent No.: US 9,057,740 B1  
(45) Date of Patent: Jun. 16, 2015

(54) PROBE-BASED DATA COLLECTION SYSTEM WITH ADAPTIVE MODE OF PROBING

(71) Applicant: DCG Systems, Inc., Fremont, CA (US)

(72) Inventors: Vladimir A. Ukraintsev, Allen, TX (US); Richard Stallcup, Frisco, TX (US); Sergiy Pryadkin, Plano, TX (US); Mike Berkmyre, Allen, TX (US); John Sanders, Coppell, TX (US)

(73) Assignee: DCG SYSTEMS, INC., Fremont, CA (US)

( * ) Notice: Subject to any disclaimer, the term of this patent is extended or adjusted under 35 U.S.C. 154(b) by 0 days.

(21) Appl. No.: 14/108,286

(22) Filed: Dec. 16, 2013

(51) Int. Cl.  
*G01Q 10/00* (2010.01)  
*G01Q 10/04* (2010.01)  
*G21K 5/10* (2006.01)  
*G01Q 30/02* (2010.01)

(52) U.S. Cl.  
CPC ............... *G01Q 10/04* (2013.01); *G01Q 30/02* (2013.01)

(58) Field of Classification Search  
CPC ..... G01Q 30/025; G01Q 10/02; G01Q 10/04; Y10S 977/849; Y10S 977/851  
USPC ............... 850/1, 2, 3, 32, 33, 40; 73/105  
See application file for complete search history.

(56) References Cited

U.S. PATENT DOCUMENTS

| 4,101,072 | A |   | 7/1978 | Weaver et al. |
|---|---|---|---|---|
| 5,907,096 | A | * | 5/1999 | Chen .............................. 73/105 |
| 2006/0284083 | A1 | * | 12/2006 | Kurenuma et al. ........... 250/309 |
| 2010/0205697 | A1 | * | 8/2010 | Iyoki et al. ........................ 850/1 |
| 2014/0380531 | A1 | * | 12/2014 | Ukraintsev et al. ............... 850/3 |

* cited by examiner

*Primary Examiner* — Nikita Wells  
(74) *Attorney, Agent, or Firm* — Nixon Peabody LLP (57) ABSTRACT

A system for analyzing a sample is described. The system for analyzing a sample includes a probe and a controller circuit. The controller circuit configured to control a movement of the probe to at least a first position and a second position on the sample based on navigation data. In response to the movement of the probe, the controller circuit is configured to adjust a force of the probe on the sample at the first position from a first force value to a second force value and the force of the probe on the sample from a third force value to a fourth force value at said second position on the sample. And, the controller circuit is configured to acquire sample data with the probe at the first position on the sample.

20 Claims, 5 Drawing Sheets

PROBE-BASED DATA COLLECTION SYSTEM WITH ADAPTIVE MODE OF PROBING

BACKGROUND

1. Field

Embodiments of the invention relate to inspection of nano-scale features of a sample. In particular, embodiments of the invention relate to a system and method for inspection of nano-scale features of a sample having regions of different characteristics using adaptive electrical probing.

2. Related Art

Scanning technologies are used to characterize and test nano-scale features of a sample for measurement, topographical mapping, testing etc., for example, for measuring features and testing performance of integrated circuits. Scanning technology instruments used to characterize and to test electrical performance of integrated circuits include atomic force prober ("AFP") and scanning electron microscopy ("SEM") based nanoprober. An AFP system is usually used in contact mode to obtain a topographical image of an integrated circuit. In contact mode, an AFP system uses a probe that is scanned over the various features of the sample in constant contact with the scanned area in order to obtain an elevation or "relief" image of the features that make up the sample, e.g., the integrated circuit. As the dimensions of the devices are shrinking with technology progress and are reaching nanometer scale, the constant force used by an AFP system to obtain an image results in damage to the devices of the integrated circuit that are scanned. Further, the force required to establish sufficient electrical contact to test the performance of one or more devices and/or components on an integrated circuit is such that damage to the integrated circuit occurs.

SEM based nanoprobing employs an electron microscopy to locate an area of interest. This approach may also damage devices and components used in the integrated circuit because the high-energy primary electrons generated by the SEM to obtain an image of the integrated circuit penetrate into the integrated circuit and generate undesired defects. This damage is especially problematic for smaller devices and components that have nanometer scale dimensions. Moreover, when the electron beam of the SEM is scanned over a dielectric, it charges the scanned area, which may interfere with the measurements. Thus, the use of an SEM at an area of an integrated circuit may modify the devices of interest obscuring the measurements and making the use of SEM based technologies problematic.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

According to described embodiments, adaptive (i.e., variable) mode of probe motion is performed during sample probing (e.g., hopping, contact scanning, non-contact scanning, taping, scanning with variable feedback type, speed, force, amplitude of oscillation, etc.), which is controlled by local properties of the sample known a priory (for example from CAD information) or/and are assessed in real time (for example from robust high signal-to-noise ratio of electrical or mechanical probe signal). One benefit of the disclosed approach is data quality improvement achieved using an optimized probe-sample interaction adjusted for and dependent on (1) local properties of the sample and also (2) type of measurement to be done at the particular location. Another benefit is preventing or minimizing possible damage to the sample and probe(s) for repeatable and precise measurements.

By utilizing disclosed embodiments, sample damage caused by contact mode of scanning used in existing atomic force probers is avoided. For example, if it is known a priori that a specific area of the sample is softer, the pressure of the probe tip is reduced when it is traversing that area. Additionally, data quality is improved, for example, by placing the probe in full stop during data acquisition. Also, disclosed embodiments lead to probe lifetime improvement, for example, by having the probe fly at safe height over areas of no-interest. Consequently, prober throughput and data quality is optimized using high-speed non-contact motion over areas of no-interest and slow contact (optimized) motion or even a full stop at sites of interest (for the period of time needed to achieve desired quality of data). In embodiment where registration is utilized, device damage, conventionally caused by primary electrons of SEM is avoided.

A system for analyzing a sample is described. The system for analyzing a sample includes a probe and a controller circuit. The controller circuit configured to control a movement of the probe to at least a first position and a second position on the sample based on navigation data. In response to the movement of the probe, the controller circuit is configured to adjust a force of the probe on the sample at the first position from a first force value to a second force value and the force of the probe on the sample from a third force value to a fourth force value at said second position on the sample. And, the controller circuit is configured to acquire sample data with the probe at the first position on the sample.

Other features and advantages of embodiments of the present invention will be apparent from the accompanying drawings and from the detailed description that follows.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Embodiments of the present invention are illustrated by way of example and not limitation in the figures of the accompanying drawings, in which like references indicate similar elements and in which.

DETAILED DESCRIPTION

Embodiments of a probe-based data collection system with adaptive mode of probing are described. In particular, a probe-based data collection system is described that is configured to have an adaptive mode of probe motion during sample probing. Such an adaptive mode of probe motion includes varying the motion of a probe during scanning a sample. According to embodiments, a probe-based data collection system is configured to vary one or more movements including, but not limited to, hopping, contact scanning, non-contact scanning, tapping, scanning with variable feedback, speed of movement, force of probe on sample, amplitude of oscillation, and other types of movement. A probe-based data collection system may be configured to vary one or more movements based on a priori information related to local properties of the sample, a type of measurement to be done at a particular location of a sample and/or data acquired during sample probing.

A probe-based data collection system with adaptive mode of probing improves quality of the data acquired because of the ability to adjust or control the movement of a probe to optimize probe-sample interaction. Further, according to some embodiments, optimizing probe-sample interaction based on a priori information related to local properties of the sample and/or a type of measurement to be done at a particular location of a sample achieves more reliable results more efficiently. In addition, the adaptive mode of probing preserves a sample from damage and/or minimizes damage of a sample and a probe because of the ability to adjust and/or control the movement of a probe based on a prior information related to local properties of the sample and/or a type of measurement to be done at a particular location of a sample. Embodiments of such a system provide repeatable and precise measurements because of the ability to adapt the movement of a probe to optimize for conditions of a sample.

Figure 1:
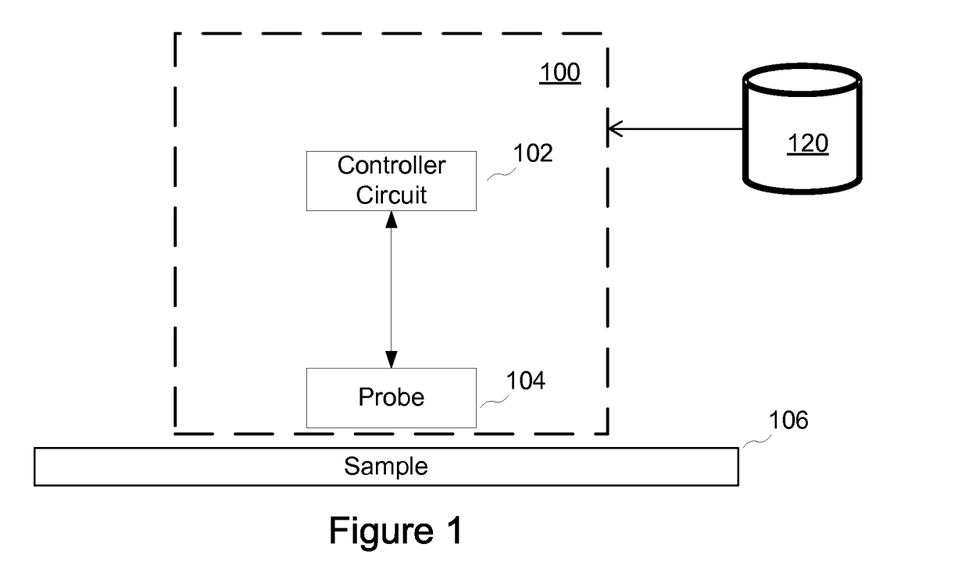
FIG. 1 illustrates a block diagram of a probe-based data collection system according to an embodiment.

FIG. 1 illustrates a block diagram of a probe-based data collection system according to an embodiment. Specifically, FIG. 1 illustrates a probe-based collection system 100 including a controller circuit 102 and a probe 104. A controller circuit 102 is coupled with a probe 104. According to an embodiment, a controller circuit 102 is coupled with a probe 104 through motors, actuators, gears, sensors, and other mechanical and/or electronic devices used to move or otherwise control a movement, a force of a probe 104, and/or a speed of a movement using techniques including those known in the art. A controller circuit 102 may include one or more components that included, but are not limited to, one or more of any of a microprocessor, a microcontroller, memory, a feedback loop, a sensor, a detector, or other components to alone or with other components control a movement of a probe 104 including components such as those know in the art.

For an embodiment, a probe 104 may be a single tip or multi-tip probe including probes such as those known in the art. For a particular embodiment, a probe 104 is configured to scan and sample an integrated circuit including components and/or devices having dimensions on the order of a few nanometers or less. A probe 104 may be configured as one or more of an electrical probe, a mechanical probe, an optical probe, a chemical probe, or other types of probe including those known in the art. A probe 104 may be a passive probe or an active probe. An active probe may include, but is not limited to, a probe configured to stimulate a sample 106 using photons, electrons, and/or other particles.

According to an embodiment, a controller circuit 102 is configured to control a movement of a probe 104 to scan and/or test a sample 106 based on local properties know a priori. Examples of local properties known a priori included, but are not limited to, material composition, topography, electrical properties, etc. For an embodiment, control of a movement of a probe 104 is based on navigation data. Navigation data may include, but is not limited to, computer-aided design data, sample image, sample fabrication data, and other data used to describe areas of interest on a sample 106 including, but not limited to, connections of and/or locations of components or devices on a sample 106. For an embodiment, navigation data may indicate a position of a component, a device, a circuit, an area of interest, or portion thereof on a sample 106. For an example, a system may use navigation data, which represents a circuit layout and indicates how components and devices in a circuit are connected, to locate a position of a component or device on a sample 106, such as an integrated circuit. A position determined by navigation data, for example, may be the location of a component or a device on a sample 106 or a portion thereof.

For an embodiment, a control circuit 102 is configured to adjust a force of a probe 104 at a position on a sample 106. A controller may be configured to adjust the force of the probe 104 at a position on a sample 106 in response to the movement of the probe 104 based on navigation data. Further, a controller circuit 102 may be configured to adjust a force of a probe 104 by controlling a movement of the probe 104 in the direction of or away from a sample 106 using techniques including those knowing in the art. For an embodiment, a force of a probe 104 on a sample 106 may be increased or decreased based on navigation data. A controller circuit 102, according to an embodiment, may control a force of a probe 104 based on sample data acquired by the probe 104. For example, a controller circuit 102 may be configured to increase the force of a probe 104 on a sample 106 at a position on the sample 106 until a signal-to-noise ratio of the sample data acquired by the probe 104 reaches a level or is within a specified range. Sample data includes but is not limited to, measurements based on capacitance, resistance, inductance, a mechanical probe signal, or other properties of a sample.

A controller circuit 102, according to an embodiment, may be configured to adjust a force of a probe 104 on a sample 106 and a movement of the probe 104 based on navigation data and/or acquired sample data. For example, CAD database 120, which is not associated with the prober, but which stores CAD data design for fabrication of the sample to be tested, can be used to obtain topographical and design data so as to derive navigation data for the prober. In one example, the NEXS Software Suite, available from DCG Systems, of Fremont, Calif., is used to provide navigation data for the prober by directly reading and cross-mapping the physical and logical design data from database 120. The NEXS suite reads the LEF (Library Exchange Format) and DEF (Design Exchange Format) files of the integrated circuit ("IC") design, e.g., GDS2 for the physical layout and Netlist for the logical circuit, and cross correlate it to generate navigation data. This navigation data is used to vary the pressure and/or speed of the probe tip depending on its location over the sample.

For an embodiment, a controller circuit 102 is configured to control a probe 104 to perform adaptive scanning. To perform adaptive scanning, a controller circuit 102 may be configured to control a speed of a movement of a probe 104 and/or a force of the probe 104 on a sample 106. The controller circuit 102 is configured to control a speed of a movement of a probe 104 and/or a force of scanning based on acquired sample data. According to an embodiment, a controller circuit 102 is configured to control a speed of a movement of a probe 104 and/or a force of scanning based on a probe signal level of acquired sample data. Once a probe signal level of sample data is detected to be with a range or is equal to a prescribed threshold, a controller circuit 102 determines that position on a sample 106 to be an area of interest to acquire sample data. Upon determining a position to acquire sample data the control unit 102 is configured to decrease the speed of the movement of the probe 104, including stopping the movement of the probe 104.

Further, the controller circuit 102 is configured to increase the force of the probe 104 based sample data. The controller circuit 102 is configured to stop the movement of the probe 104 based a probing signal level of sample data and increase the force of the probe 104 until the probing signal level reaches a prescribed level or is within a prescribed threshold range. The controller circuit 102 is configured to increase the speed of the probe 104 and decrease the force of a probe 104 once the probing signal level, for example the signal-to-noise ratio of the sample data, reaches a prescribed level or is within a prescribed threshold range. A controller circuit 102, according to an embodiment, is configured determine a position to acquired sample data based on a probe signal level.

According to another embodiment, a probe-based data collection system is configured to navigate the probe tip to the area of interest without imaging the sample at the area of interest. Instead, the controller circuit 102 is configured to register the probe 104 at a registration position. The registration position includes a position on a sample 106 outside an area of interest for investigation with a probe 104. According to an embodiment, a registration position may be determined using navigation data and may be a target fabricated specifically for the purpose of registration or simply a known feature. The controller circuit 102 may be configured to determine a registration position or verify a registration position using imaging tools. The imaging tools include, but are not limited to, microscopy including SEM, interferometry and other techniques to determine the registration location on a sample 106. Once a controller circuit 102 moves a probe 104 to a registration position, the controller circuit 102, is configured to use navigation data to move a probe 104 to a position that is an area of interest to acquire sample data on a sample 106. That is, using navigation data, such as, e.g., the NEXS, the relative position of the area of interest with respect to the registration position is determined. The controller circuit 102 is configured to move the probe 104 from the registration point to the position of interest using the relative position data. The movement of the probe tip is performed without exerting a force on the sample 106, but rather by keeping the probe tip at sufficient elevation above the sample to avoid any obstacles. This eliminates or minimizes damage to the sample 106 in the area of interest and avoids potential collision of the probe tip with high topographical features.

Figure 2:
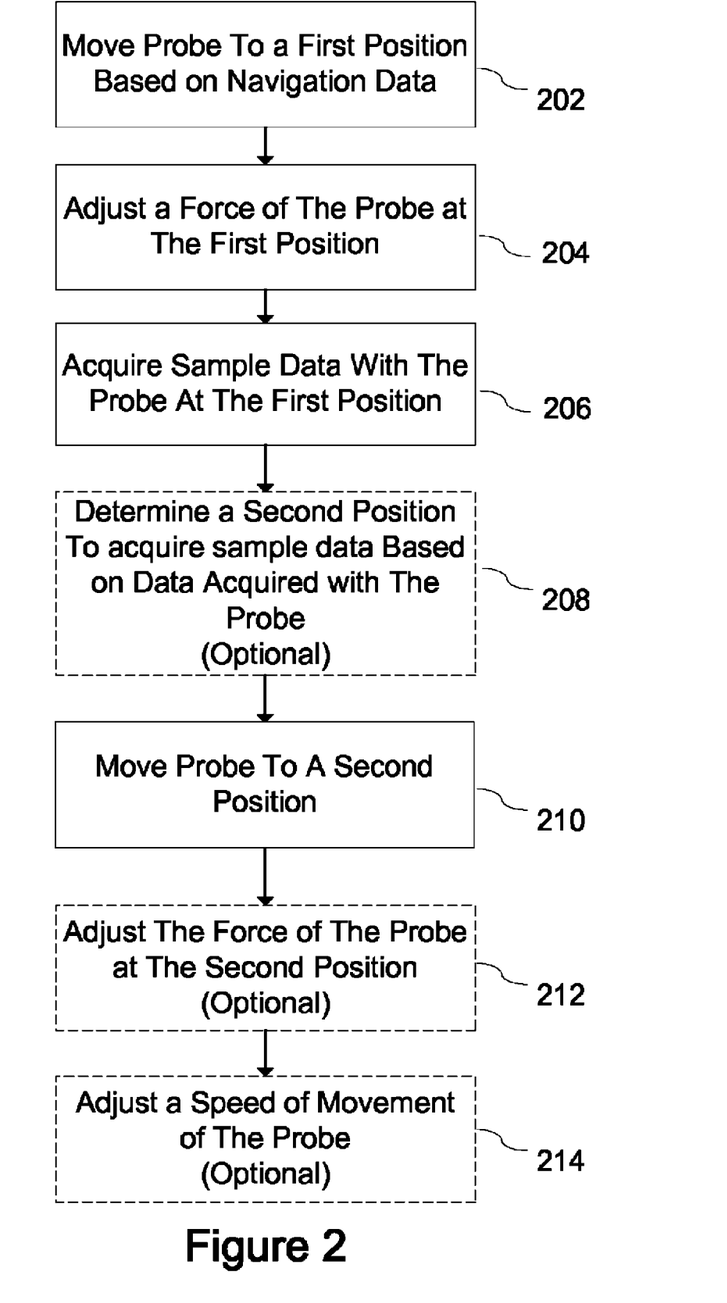
FIG. 2 illustrates a flow diagram of a method for analyzing a sample including adjusting a force of a probe according to an embodiment.

FIG. 2 illustrates a flow diagram for analyzing a sample including adjusting a force of a probe according to an embodiment. A first step includes moving the probe to a first position based on navigation or imaging data as illustrated by block 202 in FIG. 2, using techniques including those described herein. As illustrated in block 204, the controller 102 adjusts the force of the probe at the first position using techniques including those described herein. Adjustment of the probe at a position may be responsive to moving the probe to the position based on navigation data. The method also includes acquiring sample data with the probe at the first position using techniques including those described herein, as illustrated in block 206.

According to one embodiment, the method may optionally determine a second position to acquire sample data based on data acquired with the probe, as illustrated by block 208, using techniques including those described herein. As illustrated by block 210, the method includes moving the probe to a second position using techniques including those described herein. As illustrated by block 212, the method optionally includes adjusting the force of the probe at the second position using techniques including those described herein.

For some embodiments, the method may adjust the force of the probe on the sample before moving from the first position to the second position. Other embodiments include adjusting the force of the probe on the sample during moving the probe from the first position to the second position using techniques including those described herein. The method according to an embodiment optionally includes adjusting a speed of the movement of the probe as illustrated by block 214, using techniques including those described herein. For some embodiments, the method includes adjusting the speed of movement of the probe during movement from a first position to a second position based on data acquired during moving the probe. The method may also adjust the speed of movement of the probe during movement from a first position to a second position based on navigation data.

Figure 3:
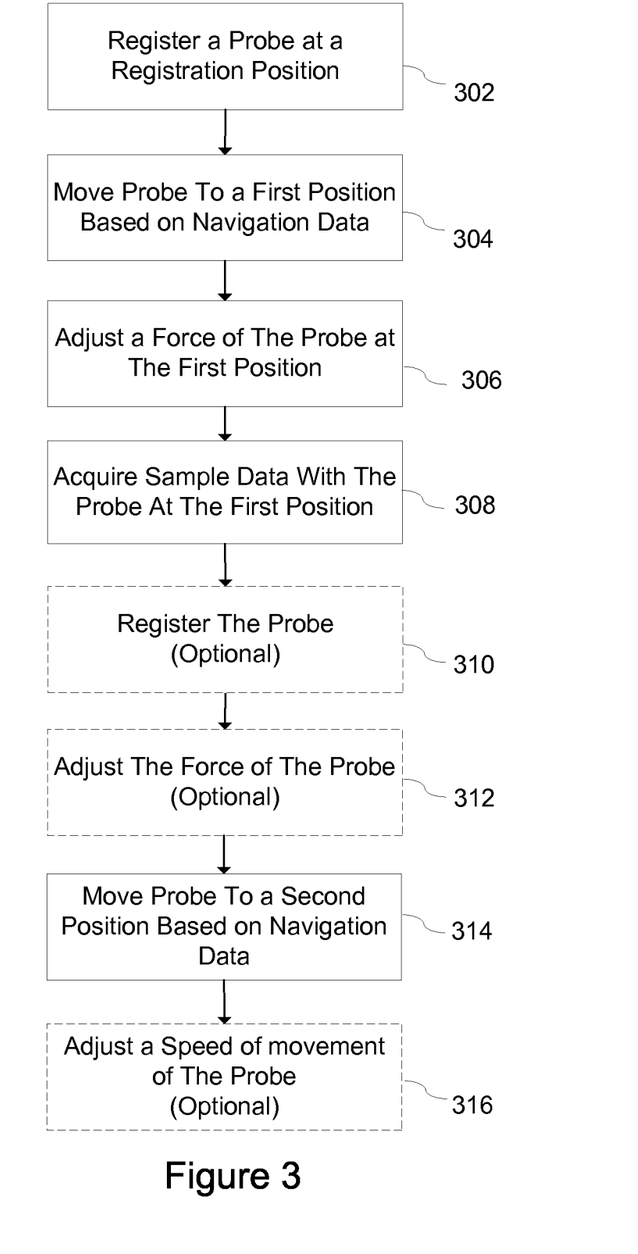
FIG. 3 illustrates a flow diagram of a method for analyzing a sample including registering a probe according to an embodiment.

FIG. 3 illustrates a flow diagram for analyzing a sample, including registering a probe according to an embodiment. The method includes registering the probe at a registration position, as illustrated by block 302, using techniques including those described herein. Referring to block 304, the method includes moving a probe to a first position based on navigation data using techniques including those described herein. As illustrated by block 306, the method adjusts the force of the probe at the first position using techniques including those described herein. Adjustment of the force of the probe may be in response to moving the probe to a position based on navigation data. The method also includes acquiring sample data with the probe at the first position using techniques including those described herein, as illustrated in block 308.

According to an embodiment, the method may optionally register the probe, as illustrated by block 310, using techniques including those described herein. The method may include registering the probe at the same registration position as used previously or at a new registration position after acquiring data with the probe at a first position. Referring to block 312, the method optionally includes adjusting the force of the probe using techniques including those described herein. The force of the probe may be adjusted after acquiring sample data at the first position to decrease the force of the probe on the sample. The force of the probe may be adjusted while the probe is moving to another position. The force of the probe may be adjusted at a second position, for example to acquire data at the second position.

Referring to block 314, the method according to an embodiment includes moving the probe to the second position using techniques including those described herein. For some embodiments, the method may adjust the force of the probe on the sample before moving from the first position to the second position. Embodiments may include adjusting the force of the probe on the sample during moving from the first position to the second position. As illustrated by block 316 in FIG. 3, the method according to an embodiment optionally includes adjusting a speed of the movement of the probe using techniques including those described herein. The method may include adjusting the speed of movement of the probe during movement from a first position to a second position based on data acquired during moving the probe. The method may also adjust the speed of movement of the probe during movement from a first position to a second position based on navigation data.

Figure 4:
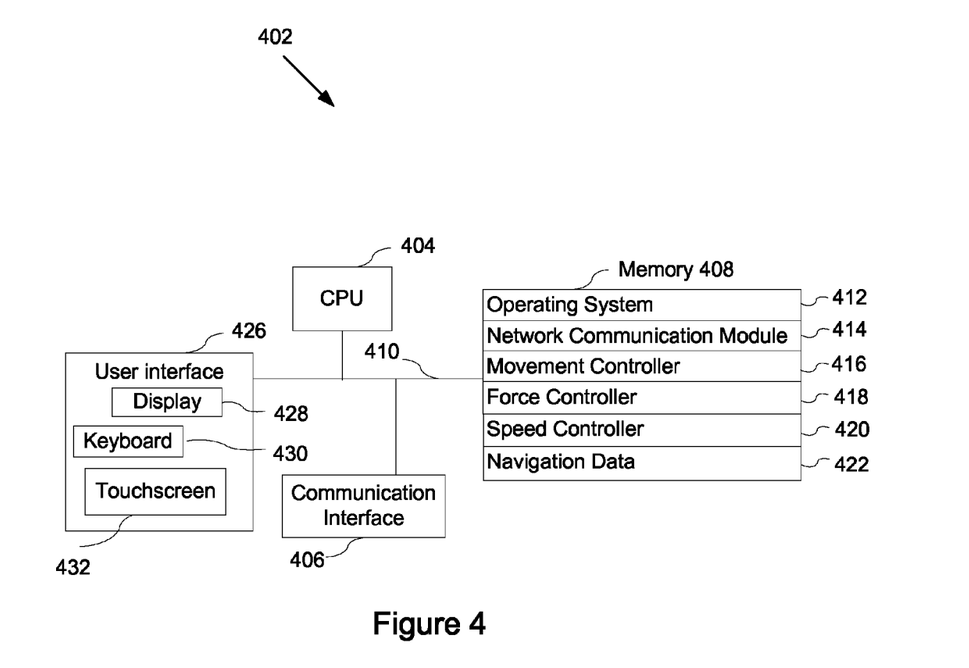
FIG. 4 illustrates a block diagram of a system for controlling a probe according to an embodiment.

FIG. 4 illustrates an embodiment of a system 402 to control a probe according to embodiments described. For an embodiment system 402 may be included a controller circuit or be coupled to a controller circuit and configured to generate one or more signals that are used by the controller circuit to adjust the movement, the force of a probe, and/or the speed of movement. The system 402 according to an embodiment includes one or more processing units (CPU's) 404, one or more network or other communication interfaces 406, a memory 408, and one or more communication buses 410 for interconnecting these components. The system 402 may optionally include a user interface 426 comprising a display device 428 and a keyboard 430. The system 402 may include a touchscreen 432 in addition to or instead of a keyboard 430 and display 428. The memory 408 may include high speed random access memory and may also include nonvolatile memory, such as one or more magnetic or optical storage disks. The memory 408 may include mass storage that is remotely located from CPU's 404. Moreover, memory 408, or alternatively one or more storage devices (e.g., one or more nonvolatile storage devices) within memory 408, includes a computer readable storage medium. The memory 408 may store the following elements, or a subset or superset of such elements: an operating system 412 that includes procedures for handling various basic system services and for performing hardware dependent tasks; a network communication module (or instructions) 414 that is used for connecting the system 402 to one or more circuits, such as a controller circuit, components, or probe via the one or more communications interfaces 406 (wired or wireless), such as a communication port, a communication circuit, Internet, other wide area networks, local area networks, metropolitan area networks, and so on; a movement controller 416 for controlling a movement of a probe; a force controller 418 for controlling a force of a probe; a speed controller 420 for controlling a speed of a movement of a probe; and navigation data 422.

Figure 5:
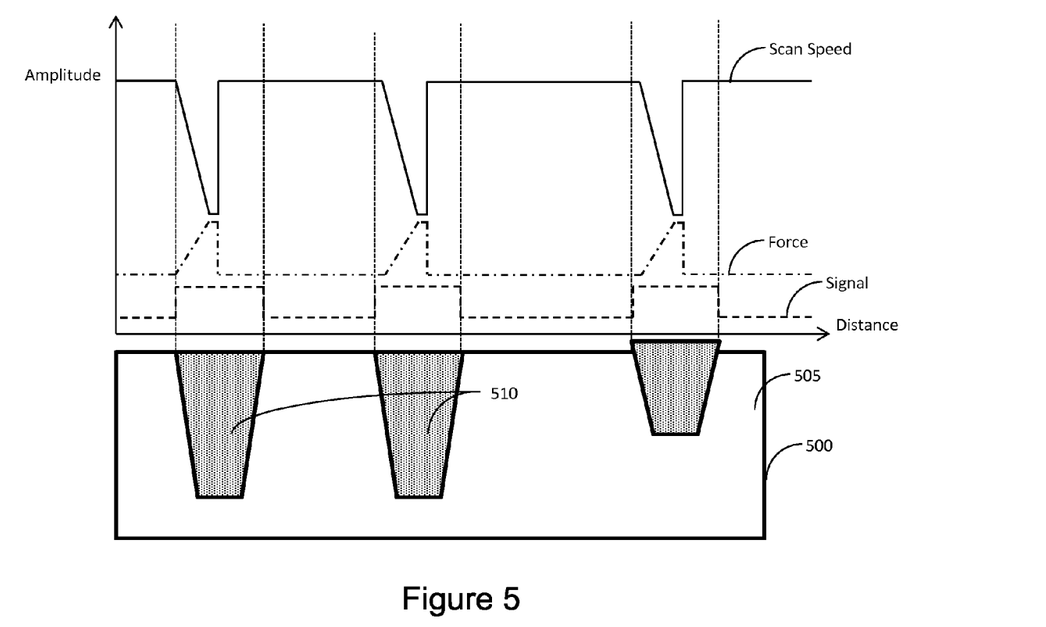
FIG. 5 illustrates an example of variable speed and probe tip force during examination of a sample.

FIG. 5 illustrates an example of variable speed and probe tip force during examination of a sample. In FIG. 5, sample 500 consists of a substrate 505 and features 510 dispersed in substrate 505. For example, features 510 may be metal lines or vias fabricated in silicon substrate 505. The features 510 may be fully embedded inside the substrate 505, or may partially or fully extend above the top surface of substrate 505. In this example, the probe is scanned over the sample to obtain test readings from the features 510. The scan starts at a given scan speed and tip force, which are designed to traverse the sample relatively fast, while exerting minimal, if any, force on the sample. As the probe starts traversing over the first features 510, the speed of the scan is reduced and the force is increased, so that a test signal having good signal to noise is obtained. That is, once proper signal level is detected, scanning speed of the probe tip is slowed down until it reaches full stop. The force of the tip is increased and data acquisition starts. Once proper probing signal-to-noise level is achieved, data acquisition stops and scanning is continued at the high speed and with low or zero force of contact. Specifically, once the tip passes the feature 510, the speed is increased and the force is reduced until the next feature 510 is reached and the process repeats itself.

Figure 6:
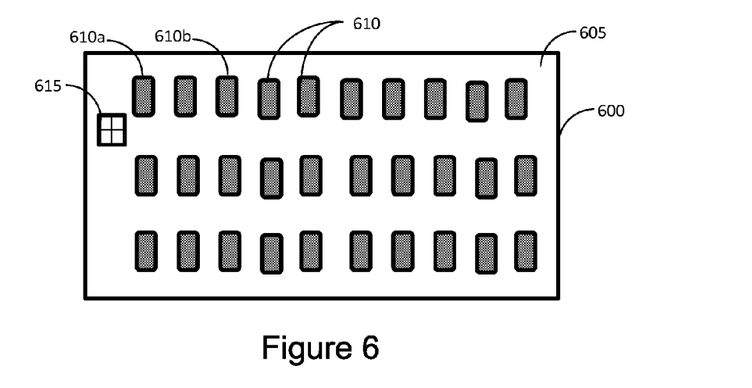
FIG. 6 illustrates an example for navigating the probe tip to a desired examination location without imaging the desired location.

FIG. 6 illustrates an example for navigating the probe tip to a desired examination location without imaging the desired location. In FIG. 6 the device under test 600 is made out of a substrate 605 with features 610. Assume, for example, the one featured desired to obtain a test reading from is feature 610b. According to one embodiment, the probe tip is navigated to a specially prepared target 615 using any available imaging method, e.g., using SEM. Then, using navigation database, such as, e.g., NEXS, the relative position of the desired feature 610b with respect to the target is calculated and the probe tip is moved to that location "blindly", i.e., without imaging. In other words, according to an embodiment, the probe tip is moved to that location such that there is no probe-sample interaction, the probe is elevated above the sample, and an electron beam of a SEM is turned off. According to another embodiment, if no target 615 is provided, the probe tip can be navigated to an available feature, e.g., feature 610a. Then, using a navigation database, such as, e.g., NEXS, the relative position of the desired feature 610b with respect to the acquired feature 610a is calculated, and the probe tip is moved to that location "blindly," i.e., without imaging. As in prior embodiments, the move to the calculated relative position is performed at relatively high speed while the probe tip is elevated above the sample, i.e., minimal or no probe tip force on the sample 600 and minimal or no electron beam irradiation on the sample 600. In either of the described cases, if after arriving at the relative position no signal is obtained, small steps can be made in various directions to attempt to acquire the desired feature.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A system for analyzing a sample comprising:
a probe; and
a controller circuit configured to:
control a movement of said probe to at least a first position and a second position on the sample based on navigation data;
in response to said movement of said probe, adjust a force of said probe on the sample at said first position from a first force value to a second force value and said force of said probe on the sample from a third force value to a fourth force value at said second position on the sample; and
acquire sample data with said probe at said first position on the sample.

2. The system of claim 1, wherein said controller circuit is configured to register said probe at a registration position on the sample.

3. The system of claim 1, wherein said controller circuit is configured to adjust said force of said probe based on navigation data.

4. The system of claim 1, wherein said navigation data is computer-aided design data.

5. The system of claim 1, wherein said controller circuit is configured to adjust said force of said probe based on acquired sample data.

6. The system of claim 1, wherein said controller circuit is configured to acquire sample data with said probe at said position until a signal-to-noise ratio is achieved.

7. The system of claim 1, wherein said controller circuit is configured to adjust said force of said probe during said movement to said first position and said second position.

8. The system of claim 1, wherein said controller circuit is configured to adjust a speed of said movement of said probe.

9. The system of claim 7, wherein said controller circuit is configured to control said movement of said probe based on sample data acquired during said movement of said probe.

10. The system of claim 9, wherein said sample data acquired is based on capacitance.

11. The system of claim 1, wherein said first force value is equal to said third force value and said second force value is equal to said fourth force value.

12. A method to analyze a sample comprising:
    moving said probe to a position based on navigation data;
    in response to moving said probe to said position based on navigation data, adjusting a force of said probe on said sample from a first force value to a second force value at said position; and
    acquiring sample data with said probe at said position.

13. The method of claim 12 further comprising:
    registering said probe at a registration position.

14. The method of claim 12 further comprising:
    moving said probe to a second position based on said navigation data; and
    adjusting said force of said probe at said second position.

15. The method of claim 14, wherein moving said probe to said second position based on said navigation data includes registering said probe at said registration position after moving said probe to said position.

16. The method of claim 12 further comprising:
    determining a second position to acquire sample data based on data acquired with said probe; and
    adjusting said force of said probe at said second position.

17. The method of claim 12, wherein said moving said probe to said position based on navigation data includes adjusting a speed of moving said probe.

18. The method of claim 12, wherein said moving said probe to a second position based on navigation data includes adjusting a speed of movement of said probe.

19. A system for scanning an integrated circuit comprising:
    a probe; and
    one or more processing units configured to control:
        moving said probe to a position based on navigation data;
        in response to said movement of said probe, adjust a force of said probe on the sample at said first position from a first force value to a second force value and said force of said probe on the sample from a third force value to a fourth force value at said second position on the sample; and
        acquire sample data with said probe at said first position on the sample.

20. The system of claim 19, wherein said one or more processing units are further configured to control registering said probe at a registration position.

* * * * *